US007698343B2

(12) United States Patent
Anderson et al.

(10) Patent No.: US 7,698,343 B2
(45) Date of Patent: Apr. 13, 2010

(54) SYSTEM AND METHOD FOR DATA TRANSFORMATION

(75) Inventors: Matthew A. Anderson, Hebron, KY (US); Russell A. McCormick, Loveland, OH (US); Hiren H. Shah, Pune (IN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 356 days.

(21) Appl. No.: 11/598,467

(22) Filed: Nov. 13, 2006

(65) Prior Publication Data

US 2008/0114719 A1 May 15, 2008

(51) Int. Cl.
*G06F 7/00* (2006.01)
*G06F 17/30* (2006.01)
(52) U.S. Cl. .................................. 707/756; 707/797
(58) Field of Classification Search ................ 707/1–3, 707/10, 104.1, 100–102
See application file for complete search history.

(56) References Cited

U.S. PATENT DOCUMENTS

| 5,970,490 | A * | 10/1999 | Morgenstern ................ 707/10 |
| 7,152,205 | B2 * | 12/2006 | Day et al. ................... 715/239 |
| 7,483,901 | B1 * | 1/2009 | Massoudi et al. ........... 707/100 |
| 7,596,573 | B2 * | 9/2009 | O'Neil et al. ............... 707/101 |
| 2002/0099738 | A1 * | 7/2002 | Grant ......................... 707/513 |
| 2004/0268249 | A1 * | 12/2004 | Fennelly et al. ............ 715/523 |
| 2005/0086584 | A1 * | 4/2005 | Sampathkumar et al. .. 715/501.1 |
| 2007/0220022 | A1 * | 9/2007 | Lankinen et al. ........... 707/101 |

OTHER PUBLICATIONS

International Search Report for PCT/US2007/084589 dated Jul. 5, 2008.
Balakrishna A et al: "Integration of CAD/CAM/CAE in Product Development System Using STEP/XML" Concurrent Engineering: Research and Applications, Academic Press, San Diego, CA, US vol. 14 No. 2, Jun. 2006 (2006-0) pp. 121-128.
Oetjens J-H et al: "Flexible Specification and Application of Rule-based Transformations in an Automotive Design Flow" Design, Automation and Test in Europe, 2006. Date '06. Proceedings Munich, Germany Mar. 6-10, 2006, Piscataway, NJ, USA, IEEE, Mar. 6, 2006, pp. 1-6.
Kagle K et al: "Professional XSL, passage" Professional XSL, Apr. 2001.

* cited by examiner

*Primary Examiner*—Don Wong
*Assistant Examiner*—Merilyn P Nguyen
(74) *Attorney, Agent, or Firm*—Michael J. Wallace

(57) ABSTRACT

A method of data transformation including receiving a selection of an input structure, the input structure having a plurality of items, transforming each item in the input structure into a node, and applying a structure map to each node to produce a plurality of output nodes. Also described is a method of data transformation including loading an input structure, the input structure having a plurality of items, at least some of the items having associated metadata, loading structure rules, applying the structure rules to the input structure to produce an output structure that corresponds to the input structure, structure rules, and the metadata, and storing the output structure. Also included are related systems and computer program products.

12 Claims, 5 Drawing Sheets

SYSTEM AND METHOD FOR DATA TRANSFORMATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE DISCLOSURE

The present disclosure is directed, in general, to a system and method for data mapping.

BACKGROUND OF THE DISCLOSURE

There have long been a number of concerns regarding the storage, use, and transfer of computer-aided engineering (CAE) analysis data. One of those concerns is the manual nature in terms of time and effort in constructing CAE meshes from a managed hierarchical product structure for analysis runs. This manual construction process can occupy a great deal of a CAE analyst's time and is mainly spent in finding existing, reusable meshes or constructing new ones and then organizing them into larger and larger assemblies.

Conversely, known solution do not provide significant functionality to make it worth the analyst's time to manage their organized data in a managed environment so the analysts fell back to ad-hoc methods of data management, thus minimizing the likelihood of leveraging reusable data components.

There is a need for a system and method for improved organized data management and manipulation, and in particular one that can be used in a CAE system.

SUMMARY OF THE DISCLOSURE

One embodiment includes a method of organized data transformation. The method includes receiving a selection of an input structure, the input structure having a plurality of items. The method further includes transforming each item in the input structure into a node. The method also includes applying a structure map to each node to produce a plurality of output nodes.

Another embodiment includes a method of data transformation. The method includes loading an input structure, the input structure having a plurality of items, at least some of the items having associated metadata. The method further includes loading structure rules. The method further includes applying the structure rules to the input structure to produce an output structure that corresponds to the input structure, structure rules, and the metadata. The method further includes storing the output structure.

Another embodiment includes a data processing system having at least a processor and accessible memory, the data processing system comprising a structure map engine. The structure map engine receives a selection of an input structure, the input structure having a plurality of items, transform each item in the input structure into a node, and apply a structure map to each node to produce a plurality of output nodes.

Another embodiment includes a data processing system having at least a processor and accessible memory, the processor configured to load an input structure, the input structure having a plurality of items, at least some of the items having associated metadata, load structure rules, apply the structure rules to the input structure to produce an output structure that corresponds to the input structure, structure rules, and the metadata; and store the output structure.

Another embodiment includes a computer program product tangibly embodied in a machine-readable medium. The computer program product includes instructions for receiving a selection of an input structure, the input structure having a plurality of items, instructions for transforming each item in the input structure into a node; and instructions for applying a structure map to each node to produce a plurality of output nodes.

Another embodiment includes a computer program product tangibly embodied in a machine-readable medium. The computer program product includes instructions for loading an input structure, the input structure having a plurality of items, at least some of the items having associated metadata, instructions for loading structure rules, instructions for applying the structure rules to the input structure to produce an output structure that corresponds to the input structure, structure rules, and the metadata, and instructions for storing the output structure.

The foregoing has outlined rather broadly the features and technical advantages of the present disclosure so that those skilled in the art may better understand the detailed description that follows. Additional features and advantages of the disclosure will be described hereinafter that form the subject of the claimed embodiments. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosed embodiments in their broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the claimed embodiments. Those skilled in the art will understand that the principles of the present disclosure may be implemented in any suitably arranged device. The numerous innovative teachings of the present application will be described with particular reference to the presently preferred embodiment.

Figure 1:
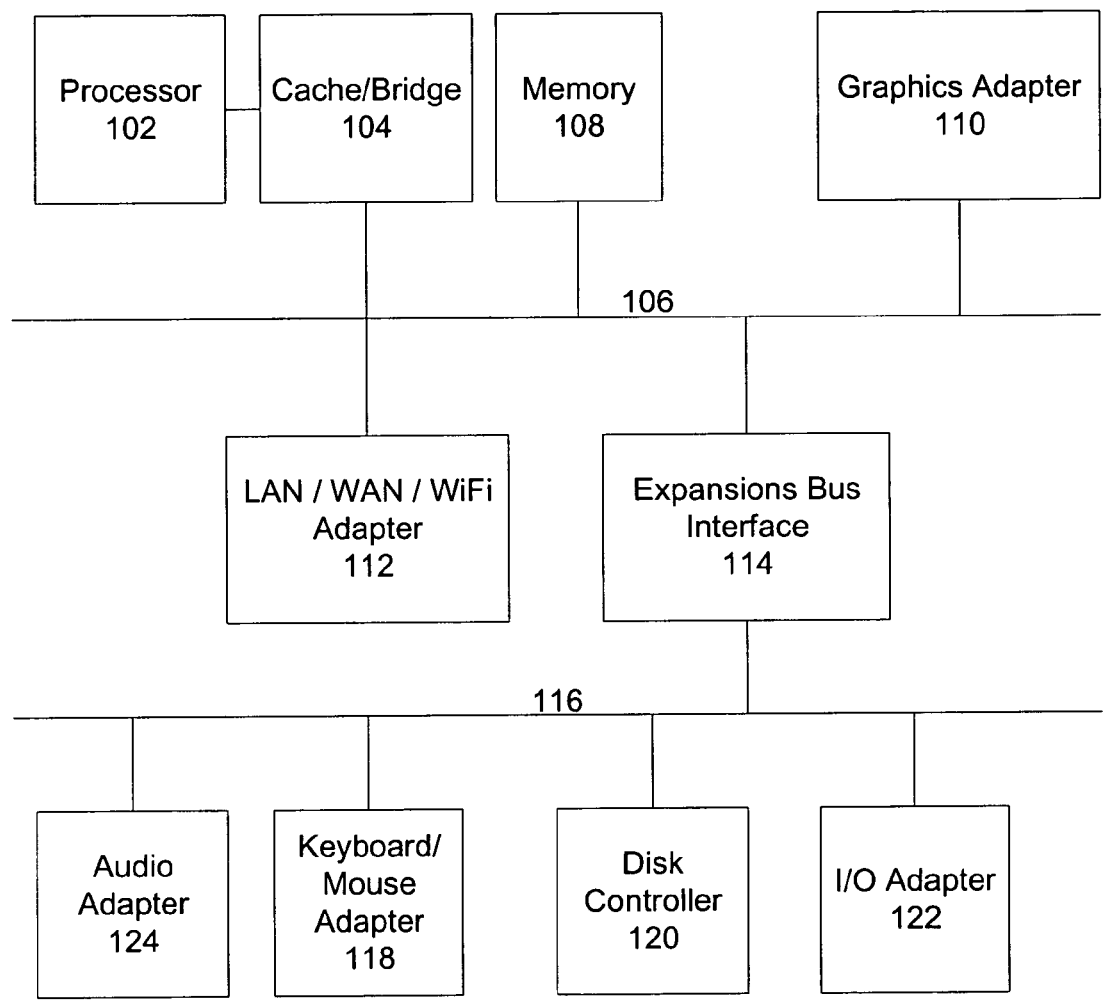
FIG. 1 depicts a block diagram of a data processing system in which a preferred embodiment can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Various embodiments include a set of extensible rule operations built on Extensible Stylesheet Language Transformations (XSLT) that collectively represent a business's process of knowledge metamorphosis. The metamorphosis process includes mapping existing managed knowledge, including and using associated metadata, into a new ancillary form of managed knowledge and customizing, recycling, altering the new form of managed knowledge based on business needs. The disclosed rules-driven knowledge metamorphosis captures the rules in a persistent manner and in a repeatable manner applies them to achieve a desired output. To execute these rules, an extensible Structure Map Engine, which can be implemented as an XML engine, is used. The Structure Map Engine can be implemented in data processing system 100, with processor 102 configured and/or programmed to perform the functions described herein.

As a particular, non-limiting, exemplary application, the techniques and processes used herein can be used as part of a CAE system. In particular, an input design structure can be transformed to an output CAE structure or analysis model as required. Such an implementation provides CAE analysts a rule-defined, automated process to build, persist, and reuse CAE analysis models. Using the disclosed system, users can interactively define a set of rules that automate the process of building ancillary data structures while leveraging a managed data environment to reuse existing data objects.

In various embodiments, Structure Map Rules (SMRs) allow a user to create a new structure of items from an existing structure. SMRs are, in some embodiments, XML-based functions that manipulate the input structure to produce an output structure, based on three principles:

1. Rules are based on existing items/revisions (input and/or output).

2. Rules are based on relationships between existing item/revisions.

3. Rules can have additional specific requirements/criteria to further refine output of Rule's application.

When these terms are used herein, a "primary" item/revision is considered the origin of the relation and the "secondary" item/revision is considered the target of the relationship.

The Structure Map Engine executes the Structure Map Rules against an input structure to generate an output structure. The items that make up that output structure are identified via the execution of pre-defined data mapping and alteration rules. Each item in the output structure reflects a corresponding item in the input structure which can be formalized via a relationship. The corresponding items in each structure are managed by an interim bridging concept called a Context Structure.

Figure 2:
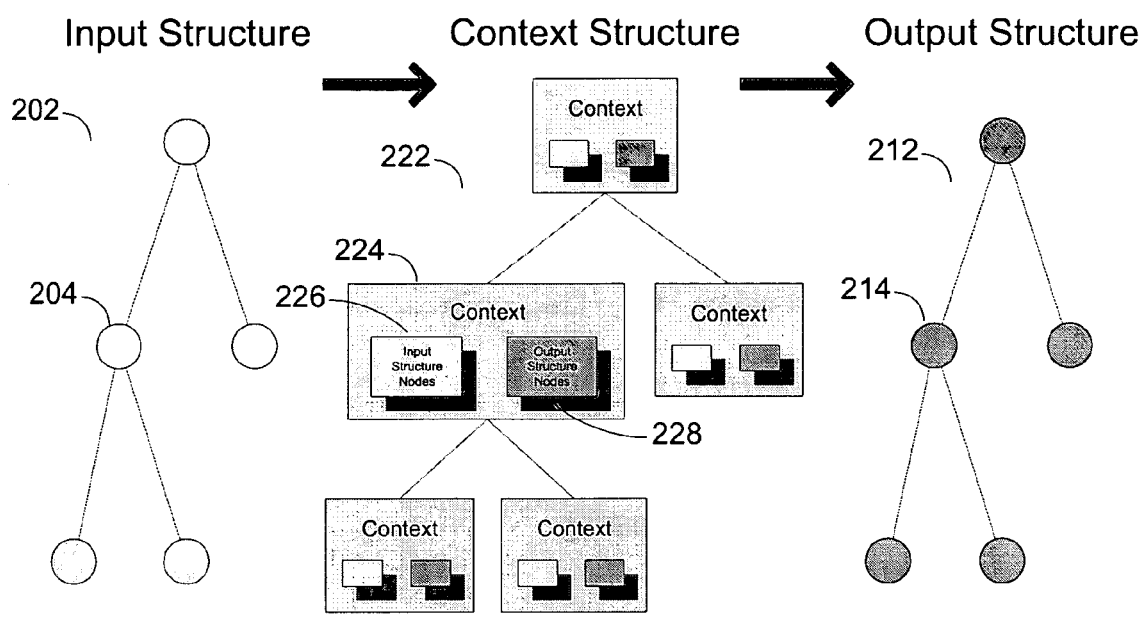
FIG. 2 depicts a block diagram illustrating relationships between the input structure, context, and output structure, in accordance with a disclosed embodiment.

FIG. 2 depicts a block diagram illustrating relationships between the input structure, the interim context structure, and the output structure, in accordance with a disclosed embodiment, after processing by the Structure Map Engine, described in more detail below. Here, an input structure 202 is shown, comprising a tree with multiple nodes 204. A corresponding output structure 212 is shown, comprising a tree with multiple nodes 214.

Context structure 222 is an interim data structure that manages all the nodes 224. Each context of the context structure 222 includes data that describes how one or more nodes 204 of input structure 202 is related to one or more nodes 214 of output structure 212. Various metadata and other information describing the relationship can be contained within each context 224, and in some embodiments, each context 224 will at least include information related to it corresponding input structure item 204 and information related to its corresponding output structure item 214.

The context structure 222 reflects the input structure 202. Each context (or instance) of the context structure 222 contains information about its parent, its children, and the corresponding nodes of the input structure 202 and output structure 212. Each item in the input structure 202 and the output structure 212 is described as a simplified item type-neutral XML format called a Node (<NODE>). A Node is a XML representation of an item's meta-data and is the basic unit on which the Structure Map Engine executed the Structure Rules.

In a CAE implementation, each item in the input structure 202 can represent the meta-data of a design item or assembly on the inventory or bill of materials (BOM) list (also referred to herein as a BOMLine) and each item in the output structure 212 can represent the meta-data of a CAEModel item or assembly on the inventory or BOMLine, as will be described in more detail below. In the output structure, each CAE item will represent, for example, a specific item or assembly, and can contain associated metadata describing various characteristics and parameters of the item or assembly. In some embodiments, each leaf node represents a discrete CAE item, such as a mesh for a single part, and each parent node of one or more leaf nodes represents a CAE assembly comprising each of the CAE items represented by its child leaf nodes.

In particular, in a CAE or other embodiment, the output structure can include variant options and conditions defined in the input structure. For example, various items or assemblies in the output structure can represent configurations of items or assemblies that are optional to be included in a CAE analysis, so that a user can optionally select to view one or another of the variant items when using the same CAE output structure.

The Node is designed to be item type-neutral and can represent any customer-defined item types as both input and output. Depending on whether the Node XML <NODE> is being used to represent the input or the output, will determine if one or more <NODE> elements will exist within the <NODES> element. An output <NODES> tag can have several <NODE> in them if the data mapping indicates secondary item types are to be generated.

Following is an exemplary XML code for an instance of an output node 214, in accordance with an embodiment of the present disclosure, and is ©2006 UGS Corp.:

```xml
<! -- Description: The following is a sample instance of an Output
NODE (CONTEXT.FOCUS = "OUT") describing a new CAE Model item
(NODE_LINE.CLASS = "ITEM" && NODE_LINE.STATE="MAPPING") with a variant
of "engine_options" and a Target relationship to the CAD_ITEM_REV in
the input NODE (Not depicted). Each data value in the XML is the
result of a data ATTR_NODE element within a ATTRIBUTES element is the
result of a data mapping rule. -->
<smn:NODES xmlns:smn="http://www.example.com/Schemas/SMENode">
    <smn:CONTEXT FOCUS="OUT" ALTERED_STATE="FILTER | INCLUDE">
        <RELATION VALUE="CHILD | SIBLING"/>
    </ smn:CONTEXT>
    <smn:NODE>
        <smn:VARIANTS>
            <smn:VARIANT_OPTION NAME="engine">
                <smn:VARIANT_VALUE VALUE="1000CC"/>
                <smn:VARIANT_VALUE VALUE="1500CC"/>
            </smn:VARIANT_OPTION>
            <smn:VARIANT_CONDITION>
                <smn:VARIANT_CLAUSE OPERATOR="AND">
                    <smn:VARIANT_CLAUSE OPERATOR="EQUAL" OPTION_NAME="option1" VALUE ="abc"/>
                    <smn:VARIANT_CLAUSE OPERATOR="EQUAL" OPTION_NAME="option2" VALUE ="abc1"/>
                </smn:VARIANT_CLAUSE>
            </smn:VARIANT_CONDITION>
        </ smn:VARIANTS>
        <smn:NODE_RELATIONS>
            <smn:NODE_RELATION RELATIONSHIP_TYPE="TC_CAE_Target">
                <smn:PRIMARY_NODE CLASS="ItemRevision" TYPE="CAEModelRevision" FOCUS="OUT"/>
                <smn:SECONDARY_NODE CLASS="ItemRevision" TYPE="ItemRevision" FOCUS="IN"/>
            </smn:NODE_RELATION>
        </smn:NODE_RELATIONS>
        <smn:NODE_LINE CLASS="Item" TYPE="CAEModel" STATE="MAPPING | REUSE">
            <smn:ATTR_NODES>
                <smn:ATTR_NODE NAME="ID" VALUE="000177"/>
                <smn:ATTR_NODE NAME="Name" VALUE="child item1"/>
                ....
            </smn:ATTR_NODES>
        </smn:NODE_LINE>
        <smn:NODE_LINE CLASS="ItemRevision" TYPE="ItemRevision" STATE=" MAPPING | REUSE">
            <smn:ATTR_NODES>
                <smn:ATTR_NODE NAME="ID" VALUE="000177"/>
                <smn:ATTR_NODE NAME="Revision" VALUE="A"/>
                .... .
            </smn:ATTR_NODES>
```

```
        </smn:NODE_LINE>
    </smn:NODE>
</smn:NODES>
```

Viewing Node Instances: In an exemplary CAE implementation, a CAE Structure Editor is used to provide the capability to view a BOMLine of a structure as a NODE instance and all the available attributes in an XML format as well as their values.

Figure 3:
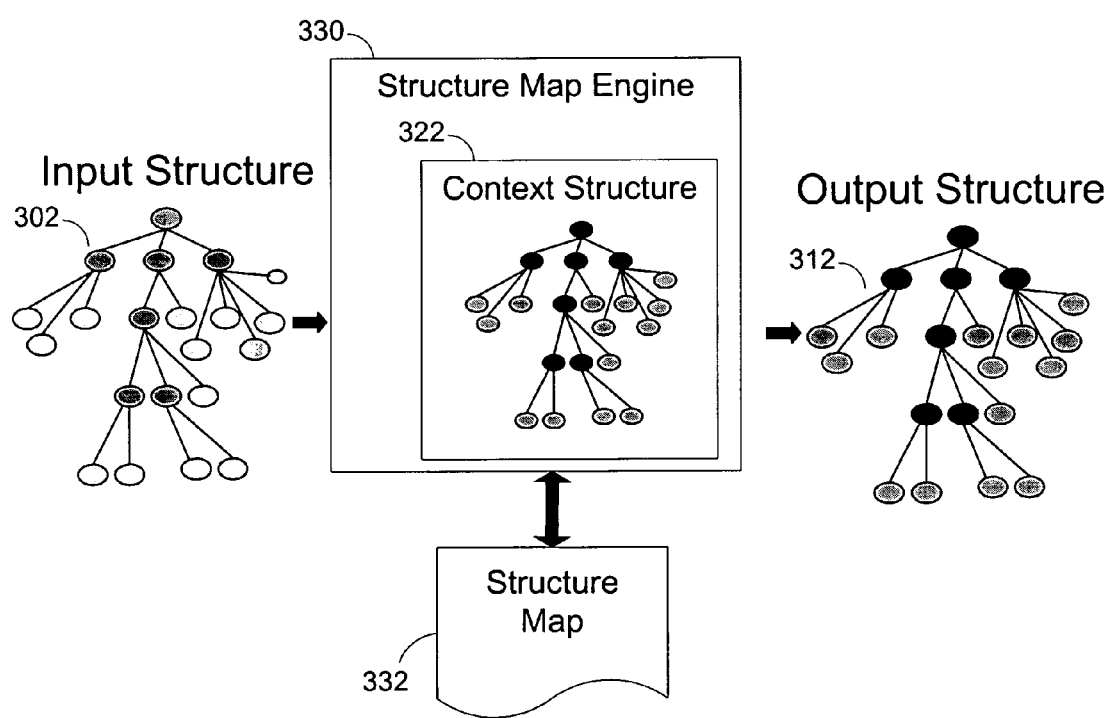
FIG. 3 depicts a block diagram illustrating the operations of a structure map engine in accordance with a disclosed embodiment.
Figure 4:
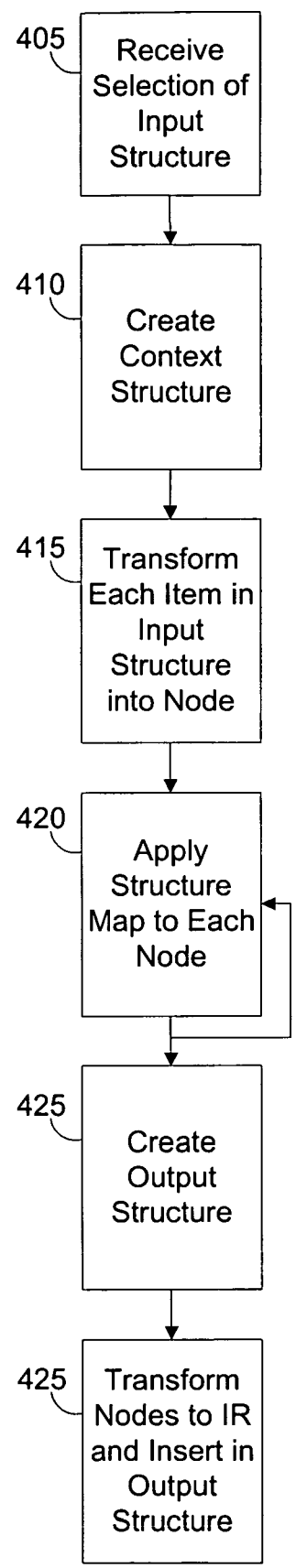
FIG. 4 depicts a flowchart of a process as illustrated in FIG. 3.

FIG. 3 depicts a block diagram illustrating the operations of a Structure Map Engine 330. FIG. 4 depicts a flowchart of a process as illustrated in FIG. 3. The Structure Map Engine operates on each node of the input structure 302 to produce output structure 312.

The Structure Map Engine (SME) 330 receives a selection of an input structure 302, along with a Structure Map 332 that defines the Structure Map Rules for the transformation (step 405) and that can include local mapping data.

The SME traverses the input structure and creates a replicate Context Structure (step 410). As the SME traverses the input structure, it transforms each item into an XML Node (step 415) and inserts it into the replicated context structure. For example, in a CAE implementation, this would include transforming each BOMLine into an XML Node and inserting the XML Node into the context structure, the node including associated metadata describing the node contents and relation to other nodes.

The SME loads the Structure Map 332, including any Structure Map Rules (i.e. Alteration Rules and any local data mapping file), as XSLT scripts and applies them to each input XML Node 226 in the Context Structure (step 420). The Structure Map Rules can include but are not limited to 2 separate categories as Data mapping rules and Alteration Rules: Filter, Reuse, and Include Rules, described below. By The SME repeats this for each item in the input structure (repeating step 420).

After all the Nodes in the context structure 322 are processed, the SME 330 creates an output structure 312 (step 425). Then, following the context structure 322 format (where applicable), the SME 330 optionally transforms (either by creation or by reusing existing) each output XML NODE into an item revision and inserts the output item or item revision into the output structure 312 (step 425).

In some embodiments, the SME can act on multiple input structures to produce an output structure that includes transformed elements from different ones of the multiple input structures.

The output structure, and any other data can be stored for later retrieval and use.

Structure Map Rule Categories: There are different categories of Structure Map Rules to support a rich set of capabilities to manipulating an input structure to produce an output structure, Data Mapping and Alteration Rules.

Data mapping rules can be used for the Structure Map Engine to produce an output. Data Mappings describe what items are linked to what items, how the items are related and what information in the input item should be transferred to the output item. The development of Data Mappings is a customer specific and usually done soon after installation and updated only as new item types are introduced/modified or additional data is needed on the CAE side.

In some embodiments, data mapping rules require, within a <NODE> element, a minimum of 2 <NODE_LINE> elements with CLASS attribute set to "ITEM" and "ITEM_REV" respectively to be valid.

Data Mapping Rules can be based on existing items/revisions (input). The following code provides an example of a data mapping rule, and is ©2006 UGS Corp.:

```
<! -- Description: Data mapping for customer-defined domain of 'CAE'.
If the conditional test for items of customer-defined type 'CAD_ITEM'
is found to be true, the template 'CAD_ITEM_TEMPLATE' is invoked via
the XSLT processor. -->
    <smr:RULE TYPE="MAPPING" DOMAIN="CAE" NAME="Item Mapping"
DESCRIPTION="">
        <xsl:if test="smn:NODES/smn:NODE/smn:NODE_LINE[@CLASS='Item' and
@TYPE='Item']">
            <xsl:call-template name="Item">
                <xsl:with-param name="Target_Node" select="."/>
                <xsl:with-param name="Rule_Name" select="'Item Mapping'"/>
            </xsl:call-template>
        </xsl:if>
    </smr:RULE>
``` applying each of these Structure Rules, in that particular order in some embodiments, the SME 330 generates one or more corresponding output XML Nodes 228 within in the same context. Of course, these specific examples do not limit the types of functions that can be applied as Alteration Rules. Other examples include but are not limited to rule types such as Substitute, default, override, organizational, and substitute attribute.

Filtering Rules, An Alteration Rule type, provide a mechanism to sift out/remove components from a structure. These can be primarily viewed as applying to the input structure to prevent certain items from being mapped over to the output structure. Filtering Rules are based on existing items/revisions, and satisfying additional specific requirements/criteria to further refine output of the rule. The following code provides an example of a filtering rule, and is ©2006 UGS Corp.:

```
<! -- Description: Filter Rule for customer-defined domain of 'CAE'.
If the conditional test for Node_Line class of 'ITEM' and type of
'CAD_ITEM' (customer defined type) where one of the item's attributes
'item_name' has a value '*BOLT' (Wildcard search for items with a name
ending in BOLT) is found to be true, the template 'FILTER_TEMPLATE' is
invoked via the XSLT processor. -->
        <smr:RULE TYPE="FILTER" DOMAIN="CAE" NAME="" DESCRIPTION="">
        <xsl:if test="smn:NODES/smn:NODE/smn:NODE_LINE[@CLASS='Item' and
@TYPE='Item']/smn:ATTR_NODES/smn:ATTR_NODE[@NAME='Name' and @VALUE =
'child item2'] ">
                <xsl:call-template name="FILTER_TEMPLATE">
                    <xsl:with-param name="Rule_Name" select="'child item2'"/>
                </xsl:call-template>
        </xsl:if>
    </smr:RULE>
```

Include rules, An Alteration Rule type, provide a mechanism to introduce and position an existing item, or item revision (IR) that's not part of the input structure so it becomes part of the output structure. This can be primarily viewed as applying to the output structure to bring in reusable items, such as CAE items that don't exist in the input structure. <ATTR_NODE> elements can only be set to attributes and not runtime properties.

In some embodiments, an Include rule is expecting only one <NODE_LINE> tag in the <NODE>. If the expected result is to include the "latest" revision of an item, then the CLASS attribute in <NODE_LINE> is set to an item type (i.e. CAEMODEL). If a specific revision is required then the CLASS attribute in NODE_LINE> is set to an item revision type (i.e. CAEMODELREVISION). "ITEM_REV" and 2 <ATTR_NODE> elements set to the item id and rev respectively to be set.

In some embodiments, Include Rules are based on existing items/revisions, and satisfying additional specific requirements/criteria to further refine output of the rule.

The following code provides an example of a filtering rule to retrieve the "latest" item revision (IR), and is ©2006 UGS Corp.:

```
<! -- Description: Include Rule for customer-defined domain of 'CAE'.
If the conditional test for Node_Line class of 'CAEMODEL' and type of
'CAEMODEL' where one of the item's attributes 'ID' has a value '1234'
is found to be true, the enclosed XML will be used to set a new
context's output node and insert it as a child of the current context's
parent (i.e. sibling). -->
        <smr:RULE TYPE="INCLUDE" DOMAIN="CAE" NAME="include item"
DESCRIPTION="">
        <xsl:if test="smn:NODES/smn:NODE/smn:NODE_LINE[@CLASS='Item' and
@TYPE='Item']/smn:ATTR_NODES/smn:ATTR_NODE[@NAME='ID' and @VALUE =
'000177'] ">
            <smn:NODES>
                <smn:CONTEXT FOCUS="OUT" ALTER_STATE="INCLUDE">
                    <smn:RELATION VALUE="SIBLING"/>
                    <smn:RULE_EXECUTED VALUE="include item"/>
                </smn:CONTEXT>
                <smn:NODE>
                    <smn:NODE_LINE CLASS="CAEModel" TYPE="CAEModel">
                        <smn:ATTR_NODES>
                            <smn:ATTR_NODE NAME="ID" VALUE="1234"/>
                        </smn:ATTR_NODES>
                    </smn:NODE_LINE>
                </smn:NODE>
            </smn:NODES>
        </xsl:if>
    </smr:RULE>
```

The following code provides an example of an Include rule to retrieve a specific item revision (IR) and is ©2006 UGS Corp.:

E_SCOPE> query will be selected. Alternately, if the XSLT script does exist and returns more than one <NODE> the first node is selected.

```
<! -- Description: Include Rule for customer-defined domain of 'CAE'.
If the conditional test for Node_Line class of 'CAEModelRevision' and
type of 'CAEModelRevision' where one of the item's attributes 'Name'
has a value 'LargeMaleDummy' and 'Revision' has a value 'L' is found to
be true, the enclosed XML will be used to set a new context's output
node and insert it as a child of the current context's parent (i.e.
sibling). -->
        <smr:RULE TYPE="INCLUDE" DOMAIN="CAE" NAME="include item" DESCRIPTION="">
        <xsl:if test="smn:NODES/smn:NODE/smn:NODE_LINE[@CLASS='Item' and
@TYPE='Item']/smn:ATTR_NODES/smn:ATTR_NODE[@NAME='ID' and @VALUE =
'000177'] ">
            <smn:NODES>
                <smn:CONTEXT FOCUS="OUT" ALTER_STATE="INCLUDE">
                    <smn:RELATION VALUE="SIBLING"/>
                    <smn:RULE_EXECUTED VALUE="include item"/>
                </smn:CONTEXT>
                <smn:NODE>
                    <smn:NODE_LINE CLASS="CAEModelRevision"
TYPE="CAEModelRevision">
                        <smn:ATTR_NODES>
                            <smn:ATTR_NODE NAME="Name" VALUE="LargeMaleDummy"/>
                            <smn:ATTR_NODE NAME="Revision" VALUE="L"/>
                        </smn:ATTR_NODES>
                    </smn:NODE_LINE>
                </smn:NODE>
            </smn:NODES>
        </xsl:if>
    </smr:RULE>
```

Reuse rules, An Alteration Rule type, provide a mechanism to recycle items already associated with an input item to be used in the output structure if they meet certain specific customer-defined requirements. In some embodiments, Reuse rules require at a minimum, a <REUSE_SCOPE> element with a <PRIMARY_NODE> and <SECONDARY_NODE> element defined inside it. The XSLT scope is optional in that if no exists then the first node returned from the <REUSE_SCOPE> query will be selected.

Reuse Rules are based on existing items/revisions, existing relationships between primary and secondary items/revisions, and satisfying additional specific requirements/criteria to further refine output of the rule.

The following code provides an example of a reuse rule, and is ©2006 UGS Corp.:

```
<! -- Description: Reuse Rule for customer-defined domain of 'CAE'.
The REUSE_SCOPE element provides the search criteria for potential
reusable items as having a relationship of type 'cae_target' between a
PRIMARY_NODE with a type of CAE_MODEL_REV and a SECONDARY_NODE with a
type of CAD_ITEM_REV. After a list is returned (as a series of XML
<NODE>), a conditional XSLT is executed against each NODE. If the
conditional test for Node_Line type of 'cae_model_rev' where one of the
item's attributes 'revision' has a value 'B' is found to be true for a
NODE, the enclosed template will be invoked to insert the current NODE
in to the output NODE. -->
    <smr:RULE TYPE="REUSE" DOMAIN="CAE" NAME="000776" DESCRIPTION="">
        <smr:REUSE_SCOPE RELATIONSHIP_TYPE="TC_CAE_Target">
            <smr:PRIMARY_NODE CLASS="CAEModelRevision"
TYPE="CAEModelRevision" FOCUS="OUT"/>
            <smr:SECONDARY_NODE CLASS="ItemRevision" TYPE="ItemRevision"
FOCUS="IN"/>
        </smr:REUSE_SCOPE>
        <xsl:if
test="smn:NODES/smn:NODE/smn:NODE_LINE [@TYPE='CAEModel']/smn:ATTR_NODES
/smn:ATTR_NODE[@NAME='Current ID' and @VALUE='000371']">
            <xsl:call-template name="REUSE_MODEL_IR_TEMPLATE">
                <xsl:with-param name="Reuse_Node" select="."/>
                <xsl:with-param name="Rule_Name" select="'000371'"/>
            </xsl:call-template>
        </xsl:if>
    </smr:RULE>
```

Templates: XSLT is a robust transformation language that supports various different approaches to defining transformation syntax. The template feature allows XSLT transformations to be externalized and reused (invoked) across multiple rules much like function or method calls in programming languages. Following are examples of some of the ways templates can be used. They are not required to execute a Structure Map Rule (as demonstrated with the include rule example above).

The following code provides an example of a CAD Item Template (from Data Mapping), and is ©2006 UGS Corp.:

```xml
<! -- Description: Data Mapping template that sets a variant option, a
CAE_Target relationship and set some attributes in the various
Node_lines. -->
    <xsl:template name="CAD_ITEM_TEMPLATE">
      <xsl:param name="Target_Node"/>
      <xsl:param name="Rule_Name"/>
      <smn:NODES>
      <smn:CONTEXT VALUE="OUT" STATE="MAPPING" >
         <smn:RULE_EXECUTED>
            <xsl:attribute name="VALUE"><xsl:value-of
select="$Rule_Name"/></xsl:attribute>
         </smn:RULE_EXECUTED>
      </smn:CONTEXT>
      <smn:NODE>
         <smn:VARIANTS>
            <!-- Loop thru the Variant Options available -->
            <xsl:for-each select="$smn:VARIANTS/smn:VARIANT_OPTION">
               <!-Check for Variant Options that start with 'engine_' -->
               <xsl:if test="@NAME=engine_*">
                  <VARIANT_OPTION >
                     <xsl:attribute name="NAME">
                        <xsl:value-of select="@NAME"/>
                     </xsl:attribute>
                     <!-- Loop thru the Variant Values available -->
                     <xsl:for-each
select="$smn:VARIANTS/smn:VARIANT_OPTION/smn:VARIANT_VALUE">
                        < smn:VARIANT_VALUE>
                           <xsl:attribute name="VALUE">
                              <!-- Set output variant option value with
                              input variant option value -->
                              <xsl:value-of select="@VALUE"/>
                           </xsl:attribute>
                        </smn:VARIANT_VALUE>
                     </xsl:for-each>
                  </smn:VARIANT_OPTION>
               </xsl:if>
            </xsl:for-each>
         </smn:VARIANTS>
         <smn:NODE_RELATIONS>
            <!-- Check for the appropriate CAE to CAD relationship -->
            <xsl:if test=" smn:NODE_LINE[@CLASS='ITEM_REV' and
                           @TYPE='CAD_ITEM_REV']"/>
               <!-- Create a Node Relationship that identifies the primary
               node and the secondary node where the secondary node is in
               the input node (from focus = in) -->
               < smn:NODE_RELATION RELATIONSHIP_TYPE="CAE_TARGET"
FOCUS="IN" >
                  < smn:PRIMARY_NODE CLASS="ITEM_REV" TYPE="CAE_TARGET"
/>
                  < smn:SECONDARY_NODE CLASS="ITEM_REV">
                     <xsl:attribute name="TYPE">
                        <xsl:value-of select=
                        "$node_line[@CLASS='ITEM_REV']@TYPE"/>
                     </xsl:attribute>
                  </smn:SECONDARY_NODE>
               </ smn:NODE_RELATION>
            </ smn:NODE_RELATIONS>
            <!-- Set this NODE as the BOMLine Node to be put in the
            structure -->
            <BOMVIEW_LINE TYPE="CAE_BOMVIEW" />
            <smn:NODE_LINE CLASS="ITEM" TYPE="CAE_MODEL_ITEM">
               <smn:ATTR_NODES >
                  <!-- Set item_name attribute to the input node's same
                  name's value -->
                  <smn:ATTR_NODE NAME="item_name">
                     <xsl:attribute name="VALUE">
                        <xsl:value-of select="$node/node_line/ smn:ATTR_NODES
                        /smn:ATTR_NODE[@NAME='item_name']/@VALUE"/>
                     </xsl:attribute>
                  </ smn:ATTR_NODE>
```

-continued

```
    </smn:ATTR_NODES >
    < smn:NODE_LINKS>
        <!-- Loop thru the Forms on input node and look for
        appropriate forms available -->
        <xsl:for-each select=
"$node_line/smn:NODE_LINKS/smn:NODE_LINK[@NAME='FORM']">
            <xsl:if test="@TYPE='item_master_form'"/>
            <smn:NODE_LINK NAME="FORM"
TYPE="cae_item_master_form"/>
        </xsl:for-each>
    </smn:NODE_LINKS>
</smn:NODE_LINE>
<!-- Check to see if an IR exists and invoke a template to manage that
translation -->
<xsl:if test="smn:NODE/smn:NODE_LINE[@CLASS='ITEM_REV' and
                                    @TYPE='CAD_ITEM_REV']">
    <!-Not depicted -->
    <xsl:call-template name="CAD_ITEM_REV_TEMPLATE">
        <xsl:with-param name="node_line"
            select=" smn:NODE_LINE[@CLASS='ITEM_REV' and
                                  @TYPE='CAD_ITEM_REV']"/>
    </xsl:call-template>
</xsl:if>
</smn:NODE>
    </smn:NODES>
</xsl:template>
```

The following code provides an example of a Filter Template, and is ©2006 UGS Corp.:

```
<xsl:template name="FILTER_TEMPLATE">
    <xsl:param name="Rule_Name"/>
    <smn:NODES>
        <smn:CONTEXT ALTER_STATE="FILTER" FOCUS="OUT">
            <smn:RULE_EXECUTED>
                <xsl:attribute name="VALUE"><xsl:value-of
select="$Rule_Name"/></xsl:attribute>
            </smn:RULE_EXECUTED>
        </smn:CONTEXT>
    </smn:NODES>
</xsl:template>
```

The following code provides an example of a Reuse Template, and is ©2006 UGS Corp.:

```
<xsl:template name="REUSE_MODEL_IR_TEMPLATE">
    <xsl:param name="node"/>
    <xsl:param name="Rule_Name"/>
    <smn:NODES>
        <smn:CONTEXT FOCUS="OUT">
            <smn:RULE_EXECUTED>
                <xsl:attribute name="VALUE"><xsl:value-of
select="$Rule_Name"/></xsl:attribute>
            </smn:RULE_EXECUTED>
        </smn:CONTEXT>
        <xsl:copy-of select="$node/smn:NODES/smn:NODE"/>
    </smn:NODES>
</xsl:template>
```

The following code provides a simple data mapping template example, and is ©2006 UGS Corp.:

```
<xsl:template name="Item">
    <xsl:param name="node"/>
    <xsl:param name="Rule_Name"/>
    <xsl:variable name="currentnodeline"
select="$node/smn:NODES/smn:NODE/smn:NODE_LINE[@CLASS='Item' and
@TYPE='Item']">
    </xsl:variable>
    <smn:NODES>
        <smn:CONTEXT VALUE="OUT">
            <smn:RULE_EXECUTED>
                <xsl:attribute name="VALUE"><xsl:value-of
select="$Rule_Name"/></xsl:attribute>
            </smn:RULE_EXECUTED>
        </smn:CONTEXT>
        <smn:NODE>
            <smn:NODE_RELATIONS>
                <smn:NODE_RELATION RELATIONSHIP_TYPE="TC_CAE_Target">
                    <smn:PRIMARY_NODE CLASS="ItemRevision"
TYPE="CAEModelRevision" FOCUS="OUT"/>
                    <smn:SECONDARY_NODE CLASS="ItemRevision"
TYPE="ItemRevision" FOCUS="IN"/>
                </smn:NODE_RELATION>
            </smn:NODE_RELATIONS>
            <smn:NODE_LINE CLASS="Item" TYPE="CAEModel" STATE="MAPPING">
```

```
            <smn:ATTR_NODES>
                <smn:ATTR_NODE NAME="Name">
                    <xsl:attribute name="VALUE"><xsl:value-of
select="$currentnodeline/smn:ATTR_NODES/smn:ATTR_NODE[@NAME='Name']/@VALUE
"/></xsl:attribute>
                </smn:ATTR_NODE>
                <smn:ATTR_NODE NAME="Description">
                    <xsl:attribute name="VALUE"><xsl:value-of
select="$currentnodeline/smn:ATTR_NODES/smn:ATTR_NODE[@NAME='Description
']/@VALUE"/></xsl:attribute>
                </smn:ATTR_NODE>
            </smn:ATTR_NODES>
        </smn:NODE_LINE>
    </smn:NODE>
  </smn:NODES>
</xsl:template>
```

The following code provides an example of a structure map with an Filter, Include, and Reuse Rule, and is ©2006 UGS Corp.:

```
<?xml version="1.0" encoding="UTF-8"?>
<smr:RULES xmlns:xsl="http://www.w3.org/1999/XSL/Transform"
xmlns:xsi="http://www.w3.org/2001/XMLSchema-instance"
xmlns:smn="http://www.example.com/Schemas/SMENode"
xmlns:smr="http://www.example.com/Schemas/SMERule">
    <smr:RULE TYPE="FILTER" DOMAIN="CAE" NAME="" DESCRIPTION="">
        <xsl:if test="smn:NODES/smn:NODE/smn:NODE_LINE[@CLASS='Item' and
@TYPE='Item']/smn:ATTR_NODES/smn:ATTR_NODE[@NAME='Name' and @VALUE =
'child item2'] ">
            <xsl:call-template name="FILTER_TEMPLATE">
                <xsl:with-param name="Rule_Name" select="'child item2'"/>
            </xsl:call-template>
        </xsl:if>
    </smr:RULE>
    <smr:RULE TYPE="INCLUDE" DOMAIN="CAE" NAME="include item"
DESCRIPTION="">
        <xsl:if test="smn:NODES/smn:NODE/smn:NODE_LINE[@CLASS='Item' and
@TYPE='Item']/smn:ATTR_NODES/smn:ATTR_NODE[@NAME='ID' and @VALUE =
'000177'] ">
            <smn:NODES>
                <smn:CONTEXT FOCUS="OUT" ALTER_STATE="INCLUDE">
                    <smn:RELATION VALUE="SIBLING"/>
                    <smn:RULE_EXECUTED VALUE="include item"/>
                </smn:CONTEXT>
                <smn:NODE>
                    <smn:NODE_LINE CLASS="CAEModelRevision"
TYPE="CAEModelRevision">
                        <smn:ATTR_NODES>
                            <smn:ATTR_NODE NAME="Name" VALUE="include item"/>
                        </smn:ATTR_NODES>
                    </smn:NODE_LINE>
                </smn:NODE>
            </smn:NODES>
        </xsl:if>
    </smr:RULE>
    <smr:RULE TYPE="REUSE" DOMAIN="CAE" NAME="000776" DESCRIPTION="">
        <smr:REUSE_SCOPE RELATIONSHIP_TYPE="TC_CAE_Target">
            <smr:PRIMARY_NODE CLASS="CAEModelRevision"
TYPE="CAEModelRevision" FOCUS="OUT"/>
            <smr:SECONDARY_NODE CLASS="ItemRevision" TYPE="ItemRevision"
FOCUS="IN"/>
        </smr:REUSE_SCOPE>
        <xsl:if
test="smn:NODES/smn:NODE/smn:NODE_LINE[@TYPE='CAEModel']/smn:ATTR_NODES
/smn:ATTR_NODE[@NAME='Current ID' and @VALUE='000371']">
            <xsl:call-template name="REUSE_MODEL_IR_TEMPLATE">
                <xsl:with-param name="Reuse_node" select="."/>
                <xsl:with-param name="Rule_Name" select="'000371'"/>
            </xsl:call-template>
        </xsl:if>
    </smr:RULE>
    <xsl:template name="REUSE_MODEL_IR_TEMPLATE">
```

-continued

```
    <xsl:param name="Reuse_Node"/>
    <xsl:param name="Rule_Name"/>
    <smn:NODES>
        <smn:CONTEXT FOCUS="OUT">
            <smn:RULE_EXECUTED>
                <xsl:attribute name="VALUE"><xsl:value-of
select="$Rule_Name"/></xsl:attribute>
            </smn:RULE_EXECUTED>
        </smn:CONTEXT>
        <xsl:copy-of select="$Reuse_Node/smn:NODES/smn:NODE"/>
    </smn:NODES>
</xsl:template>
<xsl:template name="FILTER_TEMPLATE">
    <xsl:param name="Rule_Name"/>
    <smn:NODES>
        <smn:CONTEXT ALTER_STATE="FILTER" FOCUS="OUT">
            <smn:RULE_EXECUTED>
                <xsl:attribute name="VALUE"><xsl:value-of
select="$Rule_Name"/></xsl:attribute>
            </smn:RULE_EXECUTED>
        </smn:CONTEXT>
    </smn:NODES>
</xsl:template>
</smr:RULES>
```

Figure 5:
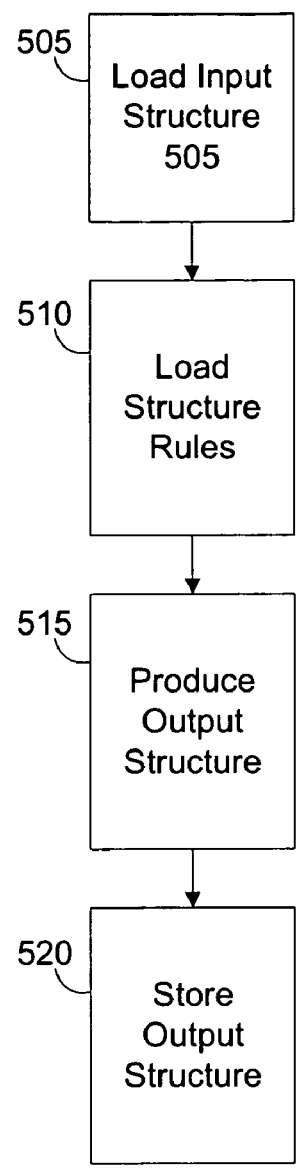
FIG. 5 depicts a flowchart of a broad process in accordance with a disclosed embodiment.

FIG. 5 depicts a flowchart of a broad process in accordance with a disclosed embodiment.

Here, the data processing system first loads an input structure (step 505), the input structure including a plurality of items and associated metadata. The input structure can correspond to a CAE inventory list or bill of materials list. As described above, "loading" in this context can include transforming input items into the input nodes and inserting them into a context structure.

Next, the system loads structure rules, as described above (step 510).

Next, the system applies the structure rules to the context structure to produce an output structure that corresponds to the input structure, structure rules, and the metadata associated with each item in the input structure (step 515). This step can include transforming the nodes in the context structure into an appropriate format and structure in the output structure so that the output structure can be used by a target application.

Next the system stores the output structure (step 520).

The following code provides examples of schemas that can be used in an exemplary embodiment, and is ©2006 UGS Corp.:

```
<?xml version="1.0" encoding="UTF-8"?>
<!--
    Filename: rule.xsd
-->
<xs:schema targetNamespace="http://www.example.com/Schemas/
SMERule"
    xmlns:smn="http://www.example.com/Schemas/SMENode"
    xmlns:xsl="http://www.w3.org/1999/XSL/Transform"
    xmlns="http://www.example.com/Schemas/SMERule"
    xmlns:xs="http://www.w3.org/2001/XMLSchema"
    elementFormDefault="qualified">
    <xs:import namespace="http://www.w3.org/1999/XSL/Transform"
    schemaLocation="tcsim_sm_xslWithiNode.xsd"/>
    <xs:element name="PRIMARY_NODE">
        <xs:annotation>
            <xs:documentation>
```

The PRIMARY_NODE element contains details for the secondary element in the relationship used to get search candidate object for a reuse rule.

Attributes:

CLASS: REQUIRED—A string field that contains class name for the secondary object in reuse rule.

TYPE: REQUIRED—A string field that contains type name for the secondary object in reuse rule.

FOCUS: REQUIRED—A enumerated field that focus for the object referred using PRIMARY_NODE.

```
            </xs:documentation>
        </xs:annotation>
        <xs:complexType>
            <xs:attribute name="CLASS" type="xs:string"
use="required"/>
            <xs:attribute name="TYPE" type="xs:string" use="required"/>
            <xs:attribute name="FOCUS" use="required">
                <xs:simpleType>
                    <xs:restriction base="xs:NMTOKEN">
                        <xs:enumeration value="IN"/>
                        <xs:enumeration value="OUT"/>
                    </xs:restriction>
                </xs:simpleType>
            </xs:attribute>
        </xs:complexType>
    </xs:element>
    <xs:element name="SECONDARY_NODE">
        <xs:annotation>
            <xs:documentation>
```

The SECONDARY_NODE element contains details for the secondary element in the relationship used to get search candidate object for a reuse rule.

Attributes:

CLASS: REQUIRED—A string field that contains class name for the secondary object in reuse rule.

TYPE: REQUIRED—A string field that contains type name for the secondary object in reuse rule.

FOCUS: REQUIRED—A enumerated field that focus for the object referred using SECONDARY_NODE.

```
        </xs:documentation>
      </xs:annotation>
      <xs:complexType>
        <xs:attribute name="CLASS" type="xs:string"
use="required"/>
        <xs:attribute name="TYPE" type="xs:string" use="required"/>
        <xs:attribute name="FOCUS" use="required">
          <xs:simpleType>
            <xs:restriction base="xs:NMTOKEN">
              <xs:enumeration value="IN"/>
              <xs:enumeration value="OUT"/>
            </xs:restriction>
          </xs:simpleType>
        </xs:attribute>
      </xs:complexType>
    </xs:element>
    <xs:element name="REUSE_SCOPE">
      <xs:annotation>
        <xs:documentation>
```

The REUSE_SCOPE element contains details for the search candidate object for a reuse rule. The REUSE_SCOPE contains the relationship that should be used for reuse rule and contains reference to PRIMARY_NODE and SECONDARY_NODE element that contain details for the elements that should be used for evaluating and searching elements for reuse purpose.

Attributes:

RELATIONSHIP_TYPE: REQUIRED—A string field that contains name of the relation type to base the search for reuse.

```
        </xs:documentation>
      </xs:annotation>
      <xs:complexType>
        <xs:sequence>
          <xs:element ref="PRIMARY_NODE"/>
          <xs:element ref="SECONDARY_NODE"/>
        </xs:sequence>
        <xs:attribute name="RELATIONSHIP_TYPE" type="xs:string"
use="required"/>
      </xs:complexType>
    </xs:element>
    <xs:element name="RULE">
      <xs:annotation>
        <xs:documentation>
```

The RULE element contains definition of an alteration/reuse/mapping rules. The RULE tag contains elements that belong to XSL namespace. This tag will contain conditional logic written in XML Schema Transformation Language. These instructions would be validated before execution of the rules take place. The rule also contains reference to REUSE_SCOPE required for reuse rules Attributes:

NAME: REQUIRED—This string field identifies the rule with a name.

DOMAIN: REQUIRED—This string field binds a rule with a certain domain.

TYPE: REQUIRED—An enumerated field that contains the type of rule, the list of acceptable values For this field is defined below.

DESCRIPTION: OPTIONAL—A string field used to provide description for the rule. This is an optional attribute that can be left blank.

```
        </xs:documentation>
      </xs:annotation>
      <xs:complexType>
        <xs:sequence>
          <xs:element ref="smn:NODES" minOccurs="0"/>
          <xs:element ref="REUSE_SCOPE" minOccurs="0"/>
          <xs:element ref="xsl:if" minOccurs="0"/>
        </xs:sequence>
        <xs:attribute name="TYPE" use="required">
          <xs:simpleType>
            <xs:restriction base="xs:NMTOKEN">
              <xs:enumeration value="FILTER"/>
              <xs:enumeration value="INCLUDE"/>
              <xs:enumeration value="REUSE"/>
              <xs:enumeration value="MAPPING"/>
            </xs:restriction>
          </xs:simpleType>
        </xs:attribute>
        <xs:attribute name="DOMAIN" type="xs:string"
use="required"/>
        <xs:attribute name="NAME" type="xs:string" use="required"/>
        <xs:attribute name="DESCRIPTION" type="xs:string"
use="optional"/>
      </xs:complexType>
    </xs:element>
    <xs:element name="RULES">
      <xs:annotation>
        <xs:documentation>
```

The RULES element contains reference to definition of set of alteration/reuse/mapping rules. The RULES tag contains elements that belong to XSL namespace.

Attributes:

NAME: REQUIRED—This string field identifies the rule with a name.

DOMAIN: REQUIRED—This string field binds a rule with a certain domain.

TYPE: REQUIRED—An enumerated field that contains the type of rule, the list of acceptable values For this field is defined below.

DESCRIPTION: OPTIONAL—A string field used to provide description for the rule. This is an optional attribute that can be left blank.

```
        </xs:documentation>
      </xs:annotation>
      <xs:complexType>
        <xs:sequence>
          <xs:element ref="RULE" maxOccurs="unbounded"/>
          <xs:element ref="xsl:template" minOccurs="0"
maxOccurs="unbounded"/>
        </xs:sequence>
      </xs:complexType>
    </xs:element>
  </xs:schema>
<?xml version="1.0" encoding="UTF-8"?>
<!--
  Filename: node.xsd
-->
<xs:schema targetNamespace="http://www.example.com/Schemas/
SMENode"
xmlns:xsl="http://www.w3.org/1999/XSL/Transform"
xmlns="http://www.example.com/Schemas/SMENode"
xmlns:xs="http://www.w3.org/2001/XMLSchema"
elementFormDefault="qualified">
  <xs:element name="ATTR_NODE">
    <xs:annotation>
      <xs:documentation>
```

The ATTR_NODE represents an attribute for the class and object type that it belongs. It contains a name-value that identifies the attribute and provides its value.

Attributes:

NAME: REQUIRED—This string field identifies a ATTR_NODE-specific attribute.

VALUE: REQUIRED—This string field contains the value of a ATTR_NODE-specific attribute.

```
    </xs:documentation>
  </xs:annotation>
  <xs:complexType>
    <xs:sequence>
      <xs:any namespace="http://www.w3.org/1999/XSL/Transform" processContents="strict" minOccurs="0" maxOccurs="2"/>
    </xs:sequence>
    <xs:attribute name="NAME" type="xs:string" use="required"/>
    <xs:attribute name="VALUE" type="xs:string" use="optional"/>
  </xs:complexType>
</xs:element>
<xs:element name="ATTR_NODES">
  <xs:annotation>
    <xs:documentation>
```

The ATTR_NODES represent list of attribute for the class and object type represented by NODE_LINE that ATTR_NODES belongs to. It refers to a list of ATTR_NODE elements.

```
    </xs:documentation>
  </xs:annotation>
  <xs:complexType>
    <xs:sequence>
      <xs:element ref="ATTR_NODE" maxOccurs="unbounded"/>
    </xs:sequence>
  </xs:complexType>
</xs:element>
<xs:element name="CONTEXT">
  <xs:annotation>
    <xs:documentation>
```

The CONTEXT represent context of current xml structure. It contains a RULE_EXECUTED, RELATION elements. The RELATION element is required only in a reuse rule.

Attributes:

FOCUS: REQUIRED—This enumerated field contains focus of current Context, that denotes whether current NODES belongs to input or output.

ALTER_STATE: OPTIONAL—This enumerated field contains altered state for a context.

```
    </xs:documentation>
  </xs:annotation>
  <xs:complexType>
    <xs:all>
      <xs:element ref="RULE_EXECUTED" minOccurs="0"/>
      <xs:element ref="RELATION" minOccurs="0"/>
    </xs:all>
    <xs:attribute name="FOCUS" use="required">
      <xs:simpleType>
        <xs:restriction base="xs:NMTOKEN">
          <xs:enumeration value="IN"/>
          <xs:enumeration value="OUT"/>
        </xs:restriction>
      </xs:simpleType>
    </xs:attribute>
    <xs:attribute name="ALTER_STATE" use="optional">
      <xs:simpleType>
        <xs:restriction base="xs:NMTOKEN">
          <xs:enumeration value="FILTER"/>
          <xs:enumeration value="INCLUDE"/>
```

```
        </xs:restriction>
      </xs:simpleType>
    </xs:attribute>
  </xs:complexType>
</xs:element>
<xs:element name="BOMVIEW">
  <xs:annotation>
    <xs:documentation>
```

The BOMVIEW represents an BOMView type for the output node.

Attributes:

TYPE: OPTIONAL—This string field identifies a TYPE name of the bomview.

```
    </xs:documentation>
  </xs:annotation>
  <xs:complexType>
    <xs:attribute name="TYPE" type="xs:string" use="optional"/>
  </xs:complexType>
</xs:element>
<xs:element name="NODE">
  <xs:annotation>
    <xs:documentation>
```

The NODE represent a logical set of object in xml structure. It refers to NODE_RELATIONS, NODE_LINE, VARIANTS elements.

```
    </xs:documentation>
  </xs:annotation>
  <xs:complexType>
    <xs:sequence>
      <xs:element ref="BOMVIEW" minOccurs="0"/>
      <xs:element ref="NODE_RELATIONS" minOccurs="0"/>
      <xs:element ref="NODE_LINE" minOccurs="0" maxOccurs="unbounded"/>
      <xs:element ref="VARIANTS" minOccurs="0"/>
      <xs:any namespace="http://www.w3.org/1999/XSL/Transform" processContents="strict" minOccurs="0" maxOccurs="unbounded"/>
    </xs:sequence>
  </xs:complexType>
</xs:element>
<xs:element name="NODES">
  <xs:annotation>
    <xs:documentation>
```

The NODES represent a logical set of object in xml structure. It refers to CONTEXT and NODE elements.

```
    </xs:documentation>
  </xs:annotation>
  <xs:complexType>
    <xs:sequence>
      <xs:element ref="CONTEXT" minOccurs="0"/>
      <xs:element ref="NODE" minOccurs="0"/>
      <xs:any namespace="http://www.w3.org/1999/XSL/Transform" processContents="strict"/>
    </xs:sequence>
  </xs:complexType>
</xs:element>
<xs:element name="NODE_LINE">
  <xs:annotation>
    <xs:documentation>
```

The NODE_LINE represent an TcEng object in xml structure. It refers ATTR_NODES and NODE_LINKS elements Attributes:

CLASS: REQUIRED—This string field contains TcEng object class information for the NODE_LINE element.

TYPE: REQUIRED—This string field contains TcEng object type information for the NODE_LINE element.

STATE: OPTIONAL—This enumerated field contains state information for the NODE_LINE element.

```
        </xs:documentation>
      </xs:annotation>
      <xs:complexType>
        <xs:sequence>
          <xs:element ref="ATTR_NODES"/>
          <xs:element ref="NODE_LINKS" minOccurs="0"/>
        </xs:sequence>
        <xs:attribute name="CLASS" use="required"/>
        <xs:attribute name="TYPE" type="xs:string" use="required"/>
        <xs:attribute name="STATE" use="optional">
          <xs:simpleType>
            <xs:restriction base="xs:NMTOKEN">
              <xs:enumeration value="MAPPING"/>
              <xs:enumeration value="REUSE"/>
            </xs:restriction>
          </xs:simpleType>
        </xs:attribute>
      </xs:complexType>
    </xs:element>
    <xs:element name="NODE_LINK">
      <xs:annotation>
        <xs:documentation>
```

The NODE_LINK represent an intra NODE inter NODE_LINE relations between TcEng object.

Attributes:

CLASS: REQUIRED—This string field contains class Name, to which the link exist for current NODE_LINK element.

TYPE: REQUIRED—This string field contains type Name, to which the link exist for current NODE_LINK element.

RELATIONSHIP_TYPE: REQUIRED—This string field contains relation name information for current NODE_LINK element.

```
        </xs:documentation>
      </xs:annotation>
      <xs:complexType>
        <xs:attribute name="CLASS" type="xs:string" use="required"/>
        <xs:attribute name="TYPE" type="xs:string" use="required"/>
        <xs:attribute name="RELATIONSHIP_TYPE" type="xs:string" use="required"/>
      </xs:complexType>
    </xs:element>
    <xs:element name="NODE_LINKS">
      <xs:annotation>
        <xs:documentation>
```

The NODE_LINKS represent a intra NODE inter NODE_LINE relations between TcEng object. It refers to list of NODE_LINK elements.

```
        </xs:documentation>
      </xs:annotation>
      <xs:complexType>
```

-continued

```
        <xs:sequence>
          <xs:element ref="NODE_LINK" minOccurs="0"/>
        </xs:sequence>
      </xs:complexType>
    </xs:element>
    <xs:element name="NODE_RELATION">
      <xs:annotation>
        <xs:documentation>
```

The NODE_RELATION represent an inter NODE relations between TcEng object. It contains PRIMARY_NODE, SECONDARY_NODE elements that provide details for the object that need the relation to be created. This element is meaningful only in a data mapping rules.

Attributes:

RELATIONSHIP_TYPE: REQUIRED—This string field contains relation name NODE_RELATION element.

```
        </xs:documentation>
      </xs:annotation>
      <xs:complexType>
        <xs:sequence>
          <xs:element ref="PRIMARY_NODE"/>
          <xs:element ref="SECONDARY_NODE"/>
        </xs:sequence>
        <xs:attribute name="RELATIONSHIP_TYPE" use="required"/>
      </xs:complexType>
    </xs:element>
    <xs:element name="NODE_RELATIONS">
      <xs:annotation>
        <xs:documentation>
```

The NODE_RELATIONS contains a list of NODE_RELATION elements, that describe inter NODE relationship between two TcEng objects. This element is meaningful only in an data mapping rules.

```
        </xs:documentation>
      </xs:annotation>
      <xs:complexType>
        <xs:sequence>
          <xs:element ref="NODE_RELATION" maxOccurs="unbounded"/>
        </xs:sequence>
      </xs:complexType>
    </xs:element>
    <xs:element name="PRIMARY_NODE">
      <xs:annotation>
        <xs:documentation>
```

The PRIMARY_NODE represents a primary TcEng object that for relation between two object. This element is referred from NODE_RELATION element Attributes:

CLASS: REQUIRED—This string field contains class name PRIMARY_NODE element.

TYPE: REQUIRED—This string field contains type name PRIMARY_NODE element.

FOCUS: REQUIRED—This enumerated field contains focus (where the node line for the node relation could be search) for NODE_RELATION element.

```
        </xs:documentation>
      </xs:annotation>
      <xs:complexType>
        <xs:attribute name="CLASS" type="xs:string" use="required"/>
        <xs:attribute name="TYPE" type="xs:string" use="required"/>
        <xs:attribute name="FOCUS" use="required">
          <xs:simpleType>
            <xs:restriction base="xs:NMTOKEN">
              <xs:enumeration value="IN"/>
              <xs:enumeration value="OUT"/>
            </xs:restriction>
          </xs:simpleType>
        </xs:attribute>
      </xs:complexType>
    </xs:element>
    <xs:element name="RULE_EXECUTED">
      <xs:annotation>
        <xs:documentation>
```

The RULE_EXECUTED represents a element that captures a value of the rule that was applicable.

Attributes:

VALUE: OPTIONAL—This string field contains rule name for RULE_EXECUTED element.

```
        </xs:documentation>
      </xs:annotation>
      <xs:complexType>
        <xs:sequence>
          <xs:any namespace="http://www.w3.org/1999/XSL/Transform" processContents="skip" minOccurs="0" maxOccurs="2"/>
        </xs:sequence>
        <xs:attribute name="VALUE" type="xs:string" use="optional"/>
      </xs:complexType>
    </xs:element>
    <xs:element name="RELATION">
      <xs:annotation>
        <xs:documentation>
```

The RELATION represents a element that captures a value of relation the current NODE has to another node. This element is required only for an include rule, and represents a relative position of the item being included.

Attributes:

VALUE: REQUIRED—This enumerated field contains relation value for RELATION element.

```
        </xs:documentation>
      </xs:annotation>
      <xs:complexType>
        <xs:attribute name="VALUE" use="required">
          <xs:simpleType>
            <xs:restriction base="xs:NMTOKEN">
              <xs:enumeration value="SIBLING"/>
              <xs:enumeration value="CHILD"/>
            </xs:restriction>
          </xs:simpleType>
        </xs:attribute>
      </xs:complexType>
    </xs:element>
    <xs:element name="SECONDARY_NODE">
      <xs:annotation>
        <xs:documentation>
```

The SECONDARY_NODE represents a secondary TcEng object that for relation between two object. This element is referred from NODE_RELATION element Attributes:

CLASS: REQUIRED—This string field contains class name SECONDARY_NODE element.

TYPE: REQUIRED—This string field contains type name SECONDARY_NODE element.

FOCUS: REQUIRED—This enumerated field contains focus (where the node line for the node relation could be search) for NODE_RELATION element.

```
        </xs:documentation>
      </xs:annotation>
      <xs:complexType>
        <xs:attribute name="CLASS" type="xs:string" use="required"/>
        <xs:attribute name="TYPE" type="xs:string" use="required"/>
        <xs:attribute name="FOCUS" use="required">
          <xs:simpleType>
            <xs:restriction base="xs:NMTOKEN">
              <xs:enumeration value="IN"/>
              <xs:enumeration value="OUT"/>
            </xs:restriction>
          </xs:simpleType>
        </xs:attribute>
      </xs:complexType>
    </xs:element>
    <xs:element name="VARIANTS">
      <xs:annotation>
        <xs:documentation>
```

The VARIANTS contains variant data contained for a node. It has reference to VARIANT_CONDITION and VARIANT_CONDITION elements

```
        </xs:documentation>
      </xs:annotation>
      <xs:complexType>
        <xs:sequence>
          <xs:element ref="VARIANT_OPTION" maxOccurs="unbounded"/>
          <xs:element ref="VARIANT_CONDITION"/>
        </xs:sequence>
      </xs:complexType>
    </xs:element>
    <xs:element name="VARIANT_CLAUSE">
      <xs:annotation>
        <xs:documentation>
```

The VARIANT_CLAUSE contains variant data contained for a node. It has reference to VARIANT_CLAUSE element Attributes:

OPERATOR: REQUIRED—This enumerated field contains operator for current VARIANT_CLAUSE element.

OPTION_NAME: OPTIONAL—This string field contains option name for current VARIANT_CLAUSE element.

VALUE: OPTIONAL—This string field contains value for the option in current VARIANT_CLAUSE element.

```
        </xs:documentation>
      </xs:annotation>
      <xs:complexType>
        <xs:sequence>
          <xs:element ref="VARIANT_CLAUSE" minOccurs="0" maxOccurs="unbounded"/>
        </xs:sequence>
```

-continued

```
<xs:attribute name="OPERATOR" use="required">
    <xs:simpleType>
        <xs:restriction base="xs:NMTOKEN">
            <xs:enumeration value="AND"/>
            <xs:enumeration value="EQUAL"/>
            <xs:enumeration value="NOT_EQUAL"/>
            <xs:enumeration value="OR"/>
            <xs:enumeration value="GREATER_THAN"/>
            <xs:enumeration value="LESS_THAN"/>
            <xs:enumeration value="GREATER_THAN_EQUAL"/>
        </xs:restriction>
    </xs:simpleType>
</xs:attribute>
<xs:attribute name="OPTION_NAME"/>
<xs:attribute name="VALUE"/>
</xs:complexType>
</xs:element>
<xs:element name="VARIANT_CONDITION">
    <xs:annotation>
        <xs:documentation>
```

The VARIANT_CONDITION contains variant condition data for a current node. It has reference to VARIANT_CLAUSE element

```
        </xs:documentation>
    </xs:annotation>
    <xs:complexType>
        <xs:sequence>
            <xs:element ref="VARIANT_CLAUSE"/>
        </xs:sequence>
    </xs:complexType>
</xs:element>
<xs:element name="VARIANT_OPTION">
    <xs:annotation>
        <xs:documentation>
```

The VARIANT_OPTION contains variant option data for a current node. It has reference to VARIANT_VALUE element Attributes:

VALUE: REQUIRED—This string field contains option name for current VARIANT_OPTION element.

```
        </xs:documentation>
    </xs:annotation>
    <xs:complexType>
        <xs:sequence>
            <xs:element ref="VARIANT_VALUE" minOccurs="0" maxOccurs="unbounded"/>
        </xs:sequence>
        <xs:attribute name="NAME" use="required"/>
    </xs:complexType>
</xs:element>
<xs:element name="VARIANT_VALUE">
    <xs:annotation>
        <xs:documentation>
```

The VARIANT_VALUE contains variant value that belong to variant option.

One embodiment includes a method of organized data transformation. The method includes receiving a collection of meta-data objects that are organized as an input structure, the input structure having a plurality of items. The method further includes converting the meta-data in each item in the input structure into a corresponding input node. The method also includes applying a set of structure maps to each input node to produce a plurality of output nodes that are used in turn as meta-data to either leverage existing items that match the meta-data criteria or create corresponding new output item instances which in either case will be organized in an output structure.

Another embodiment includes a method of data transformation. The method includes loading an input structure, the input structure having a plurality of items, at least some of the items having associated metadata. The method further includes loading a set of structure map rules. The method further includes applying the structure map rules to the input structure to produce an output structure that corresponds to the input structure, structure map rules, and the metadata. The method further includes storing the output structure.

Another embodiment includes a data processing system having at least a processor and accessible memory, the data processing system comprising a structure map engine. The structure map engine is configured to receive a selection of an input structure, the input structure having a plurality of items, converting the meta-data in each item in the input structure into a corresponding input node. The method also includes applying a set of structure maps to each input node to produce a plurality of output nodes that are used in turn as meta-data to either leverage existing items that match the meta-data criteria or create corresponding new output item instances which in either case will be organized in an output structure.

Another embodiment includes a data processing system having at least a processor and accessible memory, the processor configured to load an input structure, the input structure having a plurality of items, at least some of the items having associated metadata, load structure rules, apply the structure rules to the input structure to produce an output structure that corresponds to the input structure, structure rules, and the metadata, and store the output structure.

Another embodiment includes a computer program product tangibly embodied in a machine-readable medium. The computer program product includes instructions for receiving a selection of an input structure, the input structure having a plurality of items, instructions for converting the meta-data in each item in the input structure into a corresponding input node. The method also includes applying a set of structure maps to each input node to produce a plurality of output nodes that are used in turn as meta-data to either leverage existing items that match the meta-data criteria or create corresponding new output item instances which in either case will be organized in an output structure.

Another embodiment includes a computer program product tangibly embodied in a machine-readable medium. The computer program product includes instructions for loading an input structure, the input structure having a plurality of items, at least some of the Items having associated metadata. The computer program product also includes instructions for loading structure map rules, instructions for applying the structure map rules to the input structure to produce an output structure that corresponds to the input structure, structure map rules, and the metadata; and instructions for storing the output structure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the present disclosure has been described in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present disclosure has been described in detail, those skilled in the art will understand that various changes, substitutions, variations, and improvements of the embodiments disclosed herein may be made without departing from the spirit and scope of the disclosure in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method of data transformation, comprising:
    receiving a selection of an input structure in a data processing system, the input structure having a plurality of items;
    transforming by the data processing system each item in the input structure into a node in a context structure, each node in the context structure including data describing the node contents and the relationship of the node to other nodes; and
    applying a structure map by the data processing system to each node to produce a plurality of output nodes, the structure map having data mapping rules, alteration rules, and structure rules, the structure rules also including at least one of filter rules, reuse rules, and include rules, and storing the output nodes in the data processing system.

2. The method of claim 1, further comprising creating an output structure; and inserting items corresponding to the output nodes in the output structure.

3. The method of claim 1, further comprising creating an output structure; transforming the output nodes to item revisions; and inserting the item revisions in the output structure.

4. The method of claim 1, further comprising creating an output structure according to the output nodes, each output node corresponding to at least one input node, the output structure comprising a plurality of items; and wherein the context structure comprises a plurality of contexts that relate each output node to a corresponding one or more input nodes.

5. The method of claim 1, wherein the input structure is a computer-aided-design bill of materials list.

6. The method of claim 1, wherein at least one node of the input structure includes associated metadata.

7. The method of claim 1, wherein the structure map includes structure rules for producing the output nodes from the input nodes.

8. The method of claim 1, further comprising creating an output structure including at least one output item, each output item corresponding to at least on input item, the output structure forming a computer-aided-engineering analysis model.

9. A data processing system having at least a processor and accessible memory, the data processing system comprising a structure map engine, wherein the structure map engine is configured to
    receive a selection of an input structure, the input structure having a plurality of items;
    transform each item in the input structure into a node in a context structure, each node in the context structure including data describing the node contents and the relationship of the node to other nodes; and
    apply a structure map to each node to produce a plurality of output nodes, the structure map having data mapping rules, alteration rules, and structure rules, the structure rules also including at least one of filter rules, reuse rules, and include rules, and storing the output nodes in the data processing system.

10. The data processing system of claim 9, the structure map engine further configured to create an output structure, and insert items corresponding to the output nodes in the output structure.

11. A a tangible machine-readable storage medium encoded with instructions that cause a data processing system to perform the steps of:
    receiving a selection of an input structure, the input structure having a plurality of items;
    transforming by a data processing system each item in the input structure into a node in a context structure, each node in the context structure including data describing the node contents and the relationship of the node to other nodes; and
    applying a structure map to each node to produce a plurality of output nodes, the structure map having data mapping rules, alteration rules, and structure rules, the structure rules also including at least one of filter rules, reuse rules, and include rules, and storing the output nodes in the data processing system.

12. The machine-readable medium of claim 11, further encoded with instructions for creating an output structure and inserting items corresponding to the output nodes in the output structure.

* * * * *